(12) United States Patent
Tada (10) Patent No.: US 7,286,744 B2
(45) Date of Patent: Oct. 23, 2007

(54) APPARATUS FOR RECORDING AND REPRODUCING INFORMATION ONTO AND FROM A RECORDING MEDIUM HAVING A RING BUFFER AREA

(75) Inventor: Kenichiro Tada, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1083 days.

(21) Appl. No.: 10/013,955

(22) Filed: Dec. 13, 2001

(65) Prior Publication Data

US 2002/0090195 A1 Jul. 11, 2002

(30) Foreign Application Priority Data

Dec. 18, 2000 (JP) ............................ 2000-383597

(51) Int. Cl.
*H04N 5/76* (2006.01)
*H04N 7/00* (2006.01)
*H04N 5/00* (2006.01)

(52) U.S. Cl. ........................................ 386/46; 386/125
(58) Field of Classification Search ................ 386/45, 386/46, 125, 126; 360/7; 725/139, 141, 725/142
See application file for complete search history.

(56) References Cited

U.S. PATENT DOCUMENTS 6,678,463 B1 * 1/2004 Pierre et al. .................. 386/83

FOREIGN PATENT DOCUMENTS

| JP | 10-208392 | 8/1998 |
| JP | 10-276402 | 10/1998 |
| JP | 2000330761 A * | 11/2000 |
| JP | 2000-350136 | 12/2000 |

* cited by examiner

*Primary Examiner*—Thai Q. Tran
*Assistant Examiner*—Nigar Chowdhury
(74) *Attorney, Agent, or Firm*—Drinker Biddle & Reath LLP (57) ABSTRACT

An apparatus for recording and reproducing information which can expand a ring buffer area in a recording medium. In an apparatus for recording and reproducing information in which a ring buffer area where an information signal is circulatively recorded and reproduced and a memory area where the information signal is permanently stored are formed on a recording medium, wherein a recorded position of the information signal is set as an extension area of the ring buffer area in response to an erasing command for erasing the information signal recorded in the memory area.

6 Claims, 8 Drawing Sheets

FIG. 3A 1ST ALLOCATION MEMORY (FOR RING BUFFER AREA)

|  | EXTENT LOCATION | EXTENT LENGTH |
|---|---|---|
| 1ST AD | S | r |
| 2ND AD | U | k |
| 3RD AD |  |  |
| 4TH AD |  |  |

FIG. 3B 2ND ALLOCATION MEMORY (FOR MEMORY AREA)

|  | EXTENT LOCATION | EXTENT LENGTH |
|---|---|---|
| 1ST AD | Q | t1 |
| 2ND AD | P | t2 |
| 3RD AD |  |  |
| 4TH AD |  |  |

FIG. 4A 1ST ALLOCATION MEMORY (FOR RING BUFFER AREA)

|  | EXTENT LOCATION | EXTENT LENGTH |
|---|---|---|
| 1ST AD | S | r1 |
| 2ND AD | U | k |
| 3RD AD | S2 | r2 |
| 4TH AD |  |  |

FIG. 4B 2ND ALLOCATION MEMORY (FOR MEMORY AREA)

|  | EXTENT LOCATION | EXTENT LENGTH |
|---|---|---|
| 1ST AD | Q | t1 |
| 2ND AD | P | t2 |
| 3RD AD | S1 | t3 |
| 4TH AD |  |  |

1ST ALLOCATION MEMORY (FOR RING BUFFER AREA)

|  | EXTENT LOCATION | EXTENT LENGTH |
|---|---|---|
| 1ST AD | S | r |
| 2ND AD | U | k |
| 3RD AD |  |  |
| 4TH AD |  |  |

FIG. 7B

2ND ALLOCATION MEMORY (FOR MEMORY AREA)

|  | EXTENT LOCATION | EXTENT LENGTH |
|---|---|---|
| 1ST AD | Q | t1 |
| 2ND AD | P | t2 |
| 3RD AD |  |  |
| 4TH AD |  |  |

1ST ALLOCATION MEMORY (FOR RING BUFFER AREA)

|  | EXTENT LOCATION | EXTENT LENGTH |
|---|---|---|
| 1ST AD | S | r1 |
| 2ND AD | U | k |
| 3RD AD | R | t3 |
| 4TH AD |  |  |

FIG. 9B

2ND ALLOCATION MEMORY (FOR MEMORY AREA)

|  | EXTENT LOCATION | EXTENT LENGTH |
|---|---|---|
| 1ST AD | Q | t1−t4−t3 |
| 2ND AD | P | t2 |
| 3RD AD | L | t4 |
| 4TH AD |  |  | the ring buffer area can be extended.

APPARATUS FOR RECORDING AND REPRODUCING INFORMATION ONTO AND FROM A RECORDING MEDIUM HAVING A RING BUFFER AREA

BACKGROUND OF THE INVENTION

1. Field of the Invention

The invention relates to an apparatus for recording and reproducing information onto/from a recording medium having a ring buffer area where an information signal such as audio signal or video signal is recorded and reproduced circulatively.

2. Description of Related Art

In recent years, hard disk recorders are attracting a great attention as a recording device in which a program provided by television broadcast or the like is recorded onto a hard disk instead of a video tape. When a hard disk is used as a recording medium, the following-function, for example, can be realized. That is, while all programs which are broadcasted on that day (programs of desired channels) are sequentially recorded without any selection, the recorded program can also be reproduced simultaneously. To realize this type of recording function, a ring buffer area is provided in the hard disk. The hard disk recorder sequentially records each broadcast program received by a tuner onto the ring buffer area from a head position thereof. When the recording onto the last position of the ring buffer area is finished, a recording position returns to the head position of the ring buffer area and the recording is continued therefrom. That is, each of the broadcasted programs is sequentially recorded in the ring buffer area on the hard disk in a circulative way. If a recording capacity of the ring buffer area is set to a capacity that allows recording of all of the broadcast programs of, for example, one day, it follows that all of the programs broadcasted on that day are recorded. If, however, broadcast programs on the next day are also recorded subsequently recorded, the broadcast programs on the next day are sequentially recorded from the head position of the ring buffer area, to overwrite the previously recorded programs. That is, the programs recorded in the ring buffer area cannot be held permanently.

In order to prevent this problem, a memory area to permanently hold the programs recorded in the ring buffer area may be provided in the hard disk separately from the ring buffer area. Usage of this area is, for example, as follows. In response to a user's designation of a program which he wants to store permanently, the hard disk recorder reads out the program designated by the user from the programs recorded in the ring buffer area and records it into the memory area.

Since the recording capacity of each of the ring buffer area and memory area in the hard disk has been previously determined, only a length of program corresponding to the predetermined recording capacity can be recorded in the ring buffer area even if an empty area exists in the memory area.

OBJECTS AND SUMMARY OF THE INVENTION

The invention has been made to solve the problem descrived above and it is an object of the invention to provide an apparatus for recording and reproducing information in which a ring buffer area can be extended.

According to the present invention, there is provided an apparatus for recording and reproducing information in which a ring buffer area where an information signal is circulatively recorded and reproduced and a memory area where the information signal is permanently stored are formed on a recording medium, comprising: a memory in which allocation position information indicating a position where the ring buffer area is allocated on the recording medium has been stored; a recording and reproduction controller for performing recording and reproduction of information into/from the ring buffer area based on the allocation position information stored in the memory; an operating component for generating an erasing command signal for erasing the information signal as an erasure target from the information signal recorded in the memory area in accordance with an erasing operation; and a ring buffer area extending component for additionally storing position information of the information signal as an erasure target into the memory in order to set the area where the information signal as an erasure target has been recorded to the ring buffer area in response to the erasing command signal.

DETAILED DESCRIPTION OF THE PREFERRED EMBODIMENT

An embodiment of the invention will be described in detail below with reference to the drawings.

Figure 1:
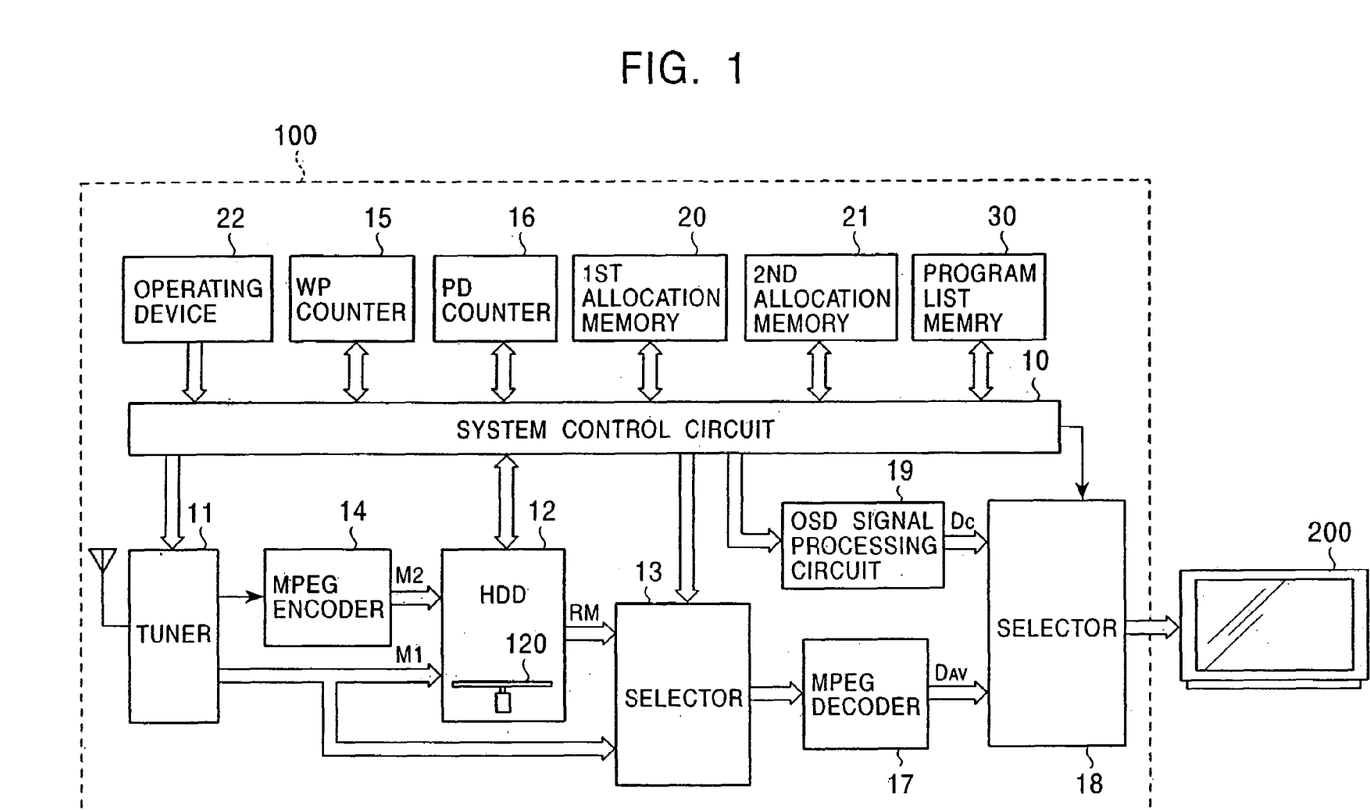
FIG. 1 is a diagram showing the construction of an apparatus for recording and reproducing information according to the invention.

FIG. 1 is a diagram showing the construction of an apparatus 100 for recording and reproducing information according to the invention.

In FIG. 1, when a channel designation signal of digital broadcast is supplied from a system control circuit 10, a tuner 11 receives a digital broadcast wave of the designated channel. At this time, the tuner 11 obtains an MPEG (Moving Picture Experts Group) signal by demodulating the received digital broadcast wave and supplies it as an MPEG signal M1 to each of a hard disk drive (HDD) 12 and a selector 13. When the channel designation signal of analog television broadcast (NTSC system, PAL system, or SECAM system) is supplied from the system control circuit 10, the tuner 11 receives an analog television broadcast wave of the designated channel. At this time, the tuner 11 supplies the television signal obtained by demodulating the received analog television broadcast wave to an MPEG encoder 14. The MPEG encoder 14 supplies the signal obtained by performing an MPEG encoding process to the television signal as an MPEG signal M2 to the HDD 12.

Figure 2A:
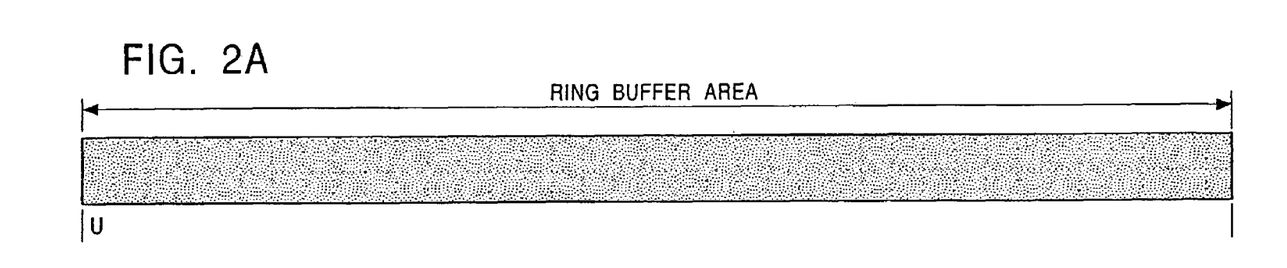
FIGS. 2A, 2B, and 2C are diagrams showing examples of transition of forms of ring buffer areas and memory areas in a hard disk 120.

The HDD 12 records the MPEG signal M1 or M2 into a ring buffer area on a hard disk 120 as shown in FIG. 2A in response to a write command signal supplied from the system control circuit 10. At this time, the system control circuit 10 retrieves a count value of a write position counter 15 as a write position WP and supplies it to the HDD 12 as a write address for designating a recording position in the ring buffer area. That is, the HDD 12 records the MPEG signal M1 or M2 to a position shown by the write position WP in the hard disk 120. The write position counter 15 starts the count-up operation in response to a count start command from the system control circuit 10. During this process, when the write position WP is supplied from the system control circuit 10, the write position counter 15 retrieves it and continues the count-up operation from the supplied value.

In response to a read command signal supplied from the system control circuit 10, the HDD 12 reads out the MPEG signal recorded in the ring buffer area on the hard disk 120 and supplies it as a reproduction MPEG signal RM to the selector 13. At this time, the system control circuit 10 retrieves a count value of a read position counter 16 as a read position RP and supplies it to the HDD 12 as a read address for designating a reading position in the ring buffer area. That is, the HDD 12 reads out the MPEG signal from a position shown by the read position RP in the ring buffer area on the hard disk 120. The read position counter 16 starts the count-up operation in response to the count start command from the system control circuit 10. During this process, when the read position RP is supplied from the system control circuit 10, the read position counter 16 retrieves it and continues the count-up operation from the supplied value.

Between the reproduction MPEG signal RM supplied from the HDD 12 and the MPEG signal M1 supplied from the tuner 11, the selector 13 alternatively selects the signal according to a selection signal supplied from the system control circuit 10 and transmits it to an MPEG decoder 17. The MPEG decoder 17 executes an MPEG decoding process to the MPEG signal supplied from the selector 13, thereby obtaining an audio/video data signal and supplying it as an audio/video data signal $D_{AV}$ to a selector 18. An OSD (On Screen Display) signal processing circuit 19 generates an operation image signal $D_C$ corresponding to an operation image in response to various operation image display commands supplied from the system control circuit 10 and supplies it to the selector 18.

Between the audio/video data signal $D_{AV}$ and the operation image signal $D_C$, the selector 18 alternatively selects the signal according to the selection signal supplied from the system control circuit 10 and transmits it to a display device 200. The display device 200 displays an image based on the audio/video data signal $D_{AV}$ supplied from the apparatus 100 for recording and reproducing information or the operation image signal $D_C$.

An allocation descriptor showing an allocation position and a recording capacity of the area constituting the ring buffer area in the hard disk 120 has been stored in a first allocation memory 20. An allocation descriptor showing an allocation position and a recording capacity of the area, that is, memory area where information (program) whose over-writing should be inhibited in the hard disk 120 has been recorded is stored in a second allocation memory 21. The allocation descriptors which are respectively recorded into the first allocation memory 20 and second allocation memory 21 will be explained hereinlater.

Recording program information showing a title, a broadcast time, a recording mode, and the like of each of the programs recorded on the hard disk 120 is stored in a program list memory 30.

An operating device 22 receives various operations from the user and transmits an operation command signal according to the operation to the system control circuit 10. A remote controller which is separately provided from a casing of the apparatus 100 for recording and reproducing information can also be used as an operating device 22.

Each of the various operations (television monitoring operation, program recording operation, continuous recording operation, storage designating operation, program erasing operation) of the apparatus 100 for recording and reproducing information which are executed by the system control circuit 10 will be explained.

(1) Television Monitoring Operation

When monitoring the program during the broadcast in real time, the user executes the designating operation of a desired channel by using the operating device 22. In accordance with this operation, the operating device 22 supplies a television monitor command signal to the system control circuit 10. In response to the TV monitor command signal, the system control circuit 10 supplies a channel designation signal for allowing the broadcast program of the desired channel to be received to the tuner 11. At the same time, the system control circuit 10 supplies a selection signal for alternatively transferring the MPEG signal M1 generated from the tuner 11 to the MPEG decoder 17 to the selector 13. The system control circuit 10 further supplies a selection signal for alternatively transferring the audio/video data signal $D_{AV}$ supplied from the MPEG decoder 17 to the display device 200 to the selector 18.

By the control operation mentioned above, the MPEG signal M1 obtained by receiving and demodulating by the tuner 11 is decoded to the audio/video data signal $D_{AV}$ by the MPEG decoder 17 and, thereafter, supplied to the display device 200. The display device 200, thus, displays the digital broadcast program of the desired channel received by the tuner 11 as an image in real-time.

(2) Program Recording Operation

Figure 2B:
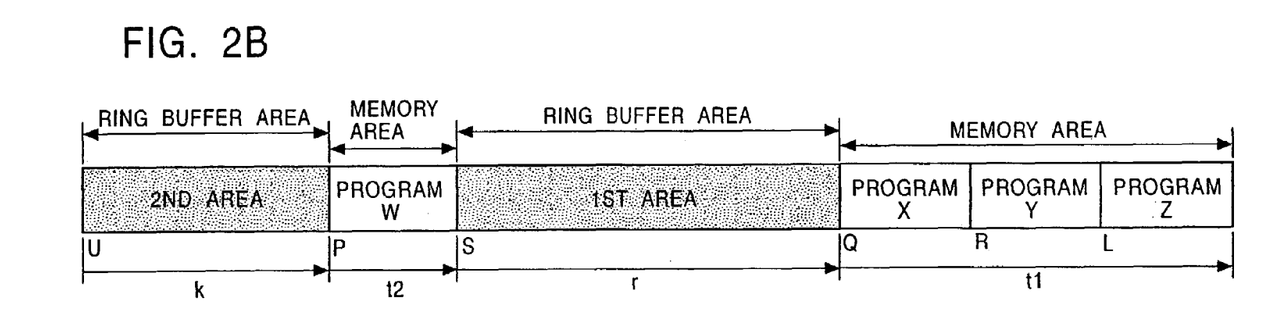
Figure 3A:
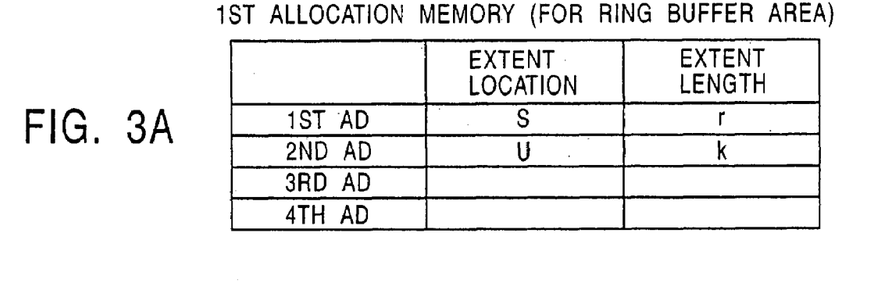
FIGS. 3A and 3B are diagrams showing examples of memory contents in a first allocation memory 20 and a second allocation memory 21.
Figure 3B:
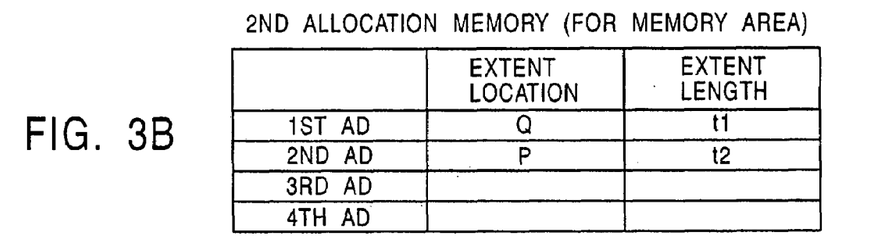

In the case of recording the broadcast program received by the tuner 11, the user executes the recording start operation by using the operating device 22 in the receiving state of the broadcast program. In accordance with the operation, the operating device 22 supplies a program recording command signal to the system control circuit 10. In response to the program recording command signal, the system control circuit 10 supplies a recording command signal for recording the MPEG signal M1 (or M2) obtained by reception and demodulation by the tuner 11 into the ring buffer area on the hard disk 120 as shown in FIG. 2A to the HDD 12. In response to the recording command signal, the HDD 12 records the MPEG signal M1 (or M2) received by the tuner 11 and showing the broadcast program into the ring buffer area on the hard disk 120. FIG. 2B is a diagram showing an example of a recording form where a broadcast program W, a program X, a program Y, and a program Z received by the tuner 11 have been recorded onto the hard disk 120. In this case, in order to use the areas where the programs W, X, Y, and Z have been recorded as memory areas where overwriting is inhibited, the system control circuit 10 allows the allocation descriptors showing the head positions and recording capacities of those areas to be stored into the second allocation memory 21 as shown in FIG. 3B. That is, a head position Q of the memory area where the programs X, Y, and Z as shown in FIG. 2B have continuously been recorded and its recording capacity t1 are stored as a first allocation descriptor (first AD) into the second allocation memory 21. Further, a head position P of the memory area where the program W as shown in FIG. 2B has been recorded and a recording capacity t2 of the memory area are stored as a second allocation descriptor (Second AD) into the second allocation memory 21. As shown in FIG. 2B, other area excluding those memory areas becomes the ring buffer area. In this case, the ring buffer area is divided into a first area and a second area as shown in FIG. 2B and formed in the hard disk 120. The system control circuit 10, therefore, allows a head position S of the first area serving as a writing (or reading) target first and a recording capacity r of the first area to be stored as a first allocation descriptor (first AD) into the first allocation memory 20 as shown in FIG. 3A. The system control circuit 10, therefore, allows a head position U of the second area serving as a writing (or reading) target next and a recording capacity k of the second area to be stored as a second allocation descriptor (second AD) into the first allocation memory 20 as shown in FIG. 3A. The head position of each area in FIGS. 3A and 3B is referred to as an extent location and the recording capacity of each area is referred to as an extent length. The system control circuit 10 further allows the recording program information showing the title, broadcast time, recording mode, and the like of each of the programs recorded on the hard disk 120 to be stored in the program list memory 30 as mentioned above.

(3) Continuous Recording Operation

When recording all of the programs of one day broadcasted by the desired channels, the user executes the continuous recording command operation by using the operating device 22. In accordance with the continuous recording command operation, the operating device 22 supplies a continuous recording command signal to the system control circuit 10. In response to the continuous recording command signal, first, the system control circuit 10 extracts the first AD as shown in FIG. 3A from the first allocation memory 20. The system control circuit 10 subsequently supplies the extent location shown in the first AD, that is, the head position S as a write position WP to the write position counter 15. The write position counter 15 extracts the write position WP and starts the count-up operation from its value, that is, from the value of the head position S. During this process, the system control circuit 10 supplies a write command signal to the HDD 12, extracts the present count value of the write position counter 15, and supplies it as a write position WP to the HDD 12. The HDD 12, thus, sequentially records the MPEG signal M1 (or M2) obtained by the reception and demodulation by the tuner 11 from the head position S of the first area in the ring buffer area on the hard disk 120 as shown in FIG. 2B. During this period of time, the system control circuit 10 discriminates whether the count value at the present point of time of the write position counter 15 is equal to the value obtained by adding the extent location and extent length shown in the first AD, that is, the value indicative of the last position of the first area or not. If it is determined that the count value at the present point of time of the write position counter 15 is equal to the value indicative of the last position of the first area, the system control circuit 10 retrieves the second AD from the first allocation memory 20. That is, upon completion of the recording in the first area in the ring buffer area, the second AD in which the position in the ring buffer area where the recording is to be subsequently executed is shown is fetched. The system control circuit 10 supplies the extent location shown in the second AD, that is, the head position U of the second area as shown in FIG. 2B as a write position WP to the write position counter 15. The write position counter 15 retrieves the write position WP and starts the count-up operation from its value, that is, the value of the head position U. During this process, the system control circuit 10 supplies the write command signal to the HDD 12 and supplies the present count value of the write position counter 15 as a write position WP to the HDD 12. The HDD 12, thus, sequentially records the MPEG signal M1 (or M2) obtained by receiving and demodulating by the tuner 11 from the head position U of the second area in the ring buffer area on the hard disk 120 as shown in FIG. 2B.

That is, when the recording of the whole first area as shown in FIG. 2B is finished, the program is subsequently recorded from the head position of the second area. During this process, the system control circuit 10 discriminates whether or not the count value at the present point of time of the write position counter 15 is equal to the value obtained by adding the extent location and extent length shown in the second AD, that is, the value indicative of the last position of the second area. If it is determined that the count value at the present point of time of the write position counter 15 is equal to the value indicative of the last position of the second area, the system control circuit 10 retrieves the next allocation descriptor from the first allocation memory 20. Since the third allocation descriptor is not stored in the first allocation memory 20 as shown in FIG. 3A, however, the system control circuit 10 retrieves the first AD from the first allocation memory 20 again and repetitively executes the operations as mentioned above. That is, upon completion of the recording in the whole second area shown in FIG. 2B, the recording position returns to the head position of the first area and the program recording as mentioned above is continued. As mentioned above, in the continuous recording operation, the allocation position of the ring buffer area is known based on the allocation descriptor stored in the first allocation memory 20. The program received by the tuner 11 is circulated in the ring buffer area and recorded.

(4) Storage Designating Operation

Figure 2C:
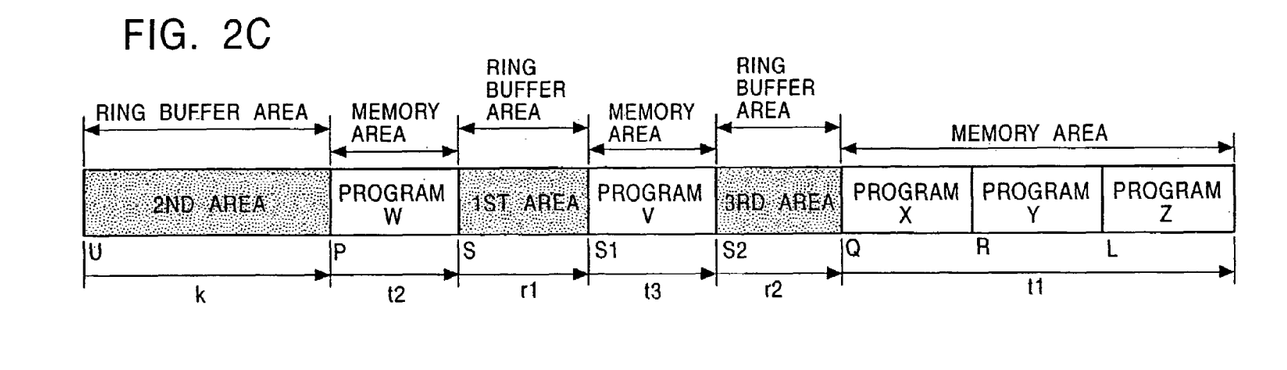
Figure 4A:
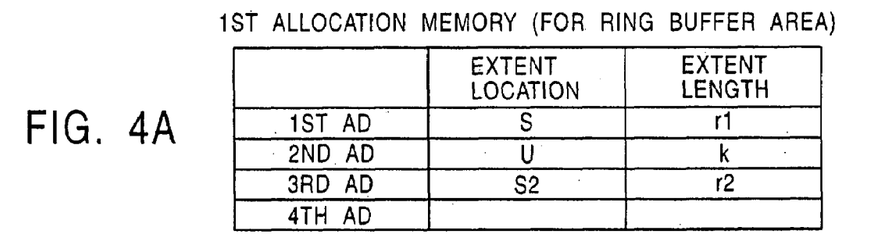
FIGS. 4A and 4B are diagrams showing memory contents in the first allocation memory 20 and the second allocation memory 21 when storing of a program V has been designated.
Figure 4B:
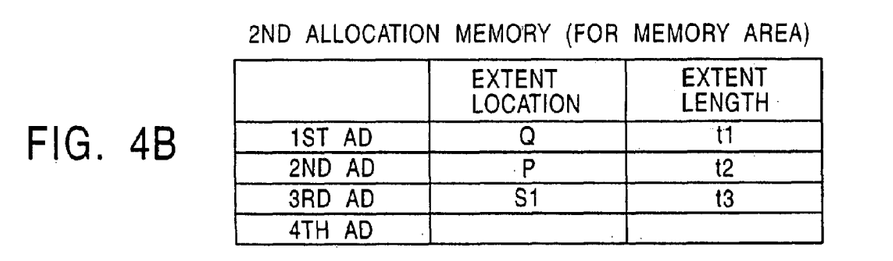

When permanently storing only a desired program among the programs recorded in the ring buffer area, the user executes the designating and storing operations of the desired program by using the operating device 22. In accordance with the operations, the operating device 22 supplies a program storage command signal to the system control circuit 10. In response to the program storage command signal, the system control circuit 10 additionally writes the information indicative of the head position of the desired program recorded in the ring buffer area and its recording capacity, that is, the allocation descriptor into the second allocation memory 21. For example, if the storage of a program V recorded in the first area as shown in FIG. 2C has been designated by the user, the system control circuit 10 additionally writes a head position S1 where the program V as shown in FIG. 2C has been recorded and its recording capacity t3 into the second allocation memory 21 as a third AD as shown in FIG. 4B. At this time, the first area shown in FIG. 2B is divided into a first area of the head position S and a recording capacity r1 and a third area of a head position S2 and a recording capacity r2 as shown in FIG. 2C. First, the system control circuit 10 rewrites an extent length "r" of the first AD stored in the first allocation memory 20 as shown in FIG. 3A to "r1" as shown in FIG. 4A. The system control circuit 10 further additionally writes the third AD indicative of the head position S2 and recording capacity r2 of the third area as shown in FIG. 4A into the first allocation memory 20 as shown in FIG. 4A. By the rewriting in the first allocation memory 20 and the second allocation memory 21 as mentioned above, the program V becomes a memory area where the permanent recording is guaranteed.

(5) Stored Program Erasing Operation

Figure 5:
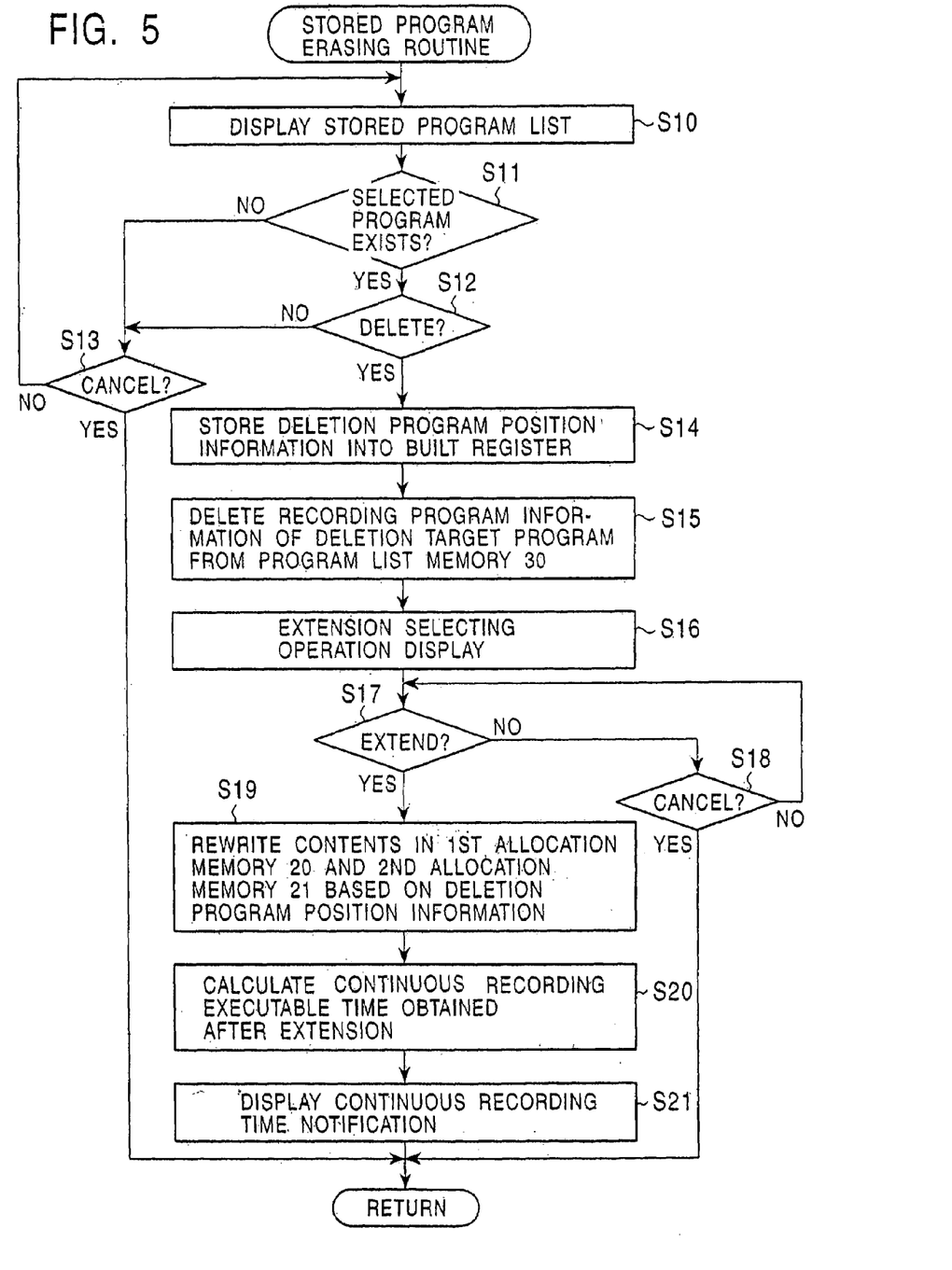
FIG. 5 is a diagram showing a stored program erasing routine.
Figure 6A:
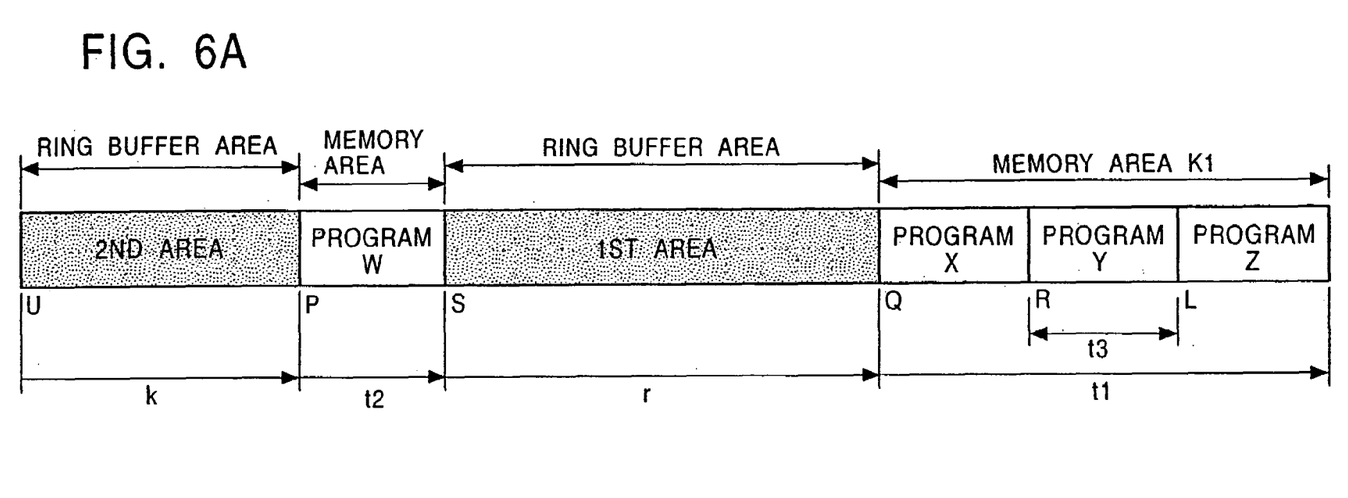
FIGS. 6A and 6B are diagrams showing examples of transition of the forms of the ring buffer areas and memory areas in the hard disk 120.
Figure 7A:
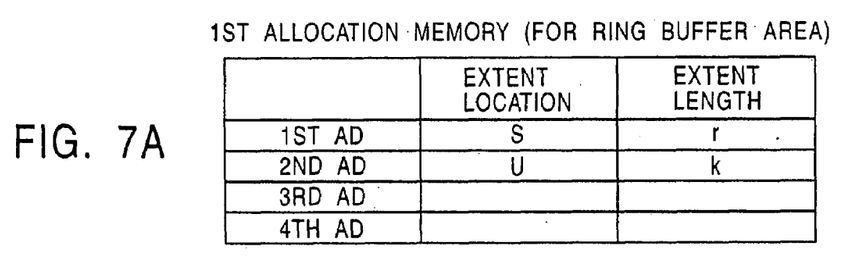
FIGS. 7A and 7B are diagrams showing examples of memory contents in the first allocation memory 20 and the second allocation memory 21.
Figure 7B:
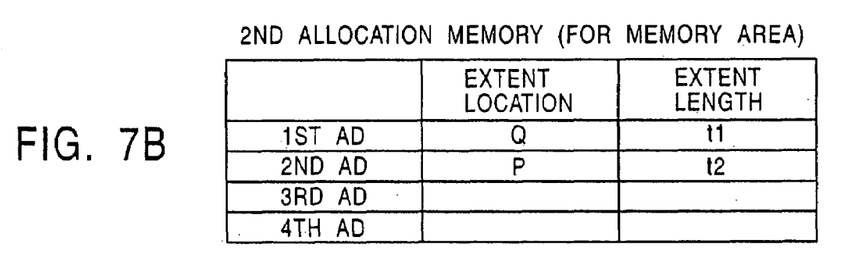

When erasing the program recorded in the memory area, the user executes the designating and erasing operations of the program serving as an erasure target by using the operating device 22. In accordance with the operations, the operating device 22 supplies a program erasing command signal to the system control circuit 10. In response to the program erasing command signal, the system control circuit 10 executes a control according to a stored program erasing routine as shown in FIG. 5. In this instance, a recording format in the hard disk 120 is shown in FIG. 6A. In association with the recording format, it is assumed that an allocation descriptor as shown in FIG. 7A has been stored in the first allocation memory 20 and an allocation descriptor as shown in FIG. 7B has been stored in the second allocation memory 21, respectively.

Figure 8A:
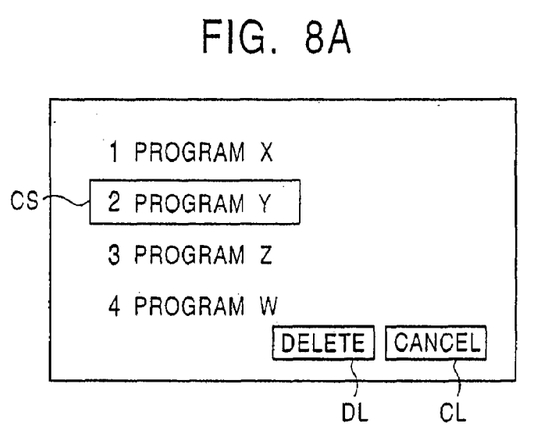
FIGS. 8A, 8B, and 8C are diagrams showing examples of an operation image which is displayed on a display device 200 during the execution of the stored program erasing routine.

In FIG. 5, first, the system control circuit 10 reads out title information of each of the programs recorded in the memory area on the hard disk 120 from the program list memory 30 and supplies a display command for displaying a list of the read-out title information to the OSD signal processing circuit 19. The system control circuit 10 further supplies a selection signal for alternatively supplying the operation image signal $D_C$ generated from the OSD signal processing circuit 19 to the display device 200 to the selector 18 (step S10). In accordance with the execution of step S10, the display device 200 displays a list of the storage programs as shown in FIG. 8A. Subsequently, by operating the operating device 22 by the user, the system control circuit 10 shifts a selection frame CS displayed on the screen as shown in FIG. 8A and discriminates whether the selecting operation of the program to be deleted has been executed or not (step S11). If it is determined in step S11 that the selecting operation has been executed, the system control circuit 10 subsequently discriminates whether the clicking operation of a delete button DL displayed on the screen as shown in FIG. 8A has been executed by operating the operating device 22 by the user or not (step S12). If it is determined in step S12 that the clicking operation of the delete button DL is not executed, the system control circuit 10 subsequently discriminates whether the clicking operation of a cancel button CL displayed on the screen as shown in FIG. 8A has been executed by operating the operating device 22 by the user or not (step S13). That is, whether the user has stopped the stored program erasing operation or not is discriminated in step S13. Also if it is decided in step S11 that the selecting operation is not executed, step S13 is executed. If it is determined in step S13 that that the clicking operation of the cancel button CL is not executed, the system control circuit 10 returns to the execution of step S10 and repetitively executes the operations as mentioned above. That is, until the user clicks the cancel button CL or the delete button DL, the system control circuit 10 continues the display of the list of the storage programs as shown in FIG. 8A.

Figure 8B:
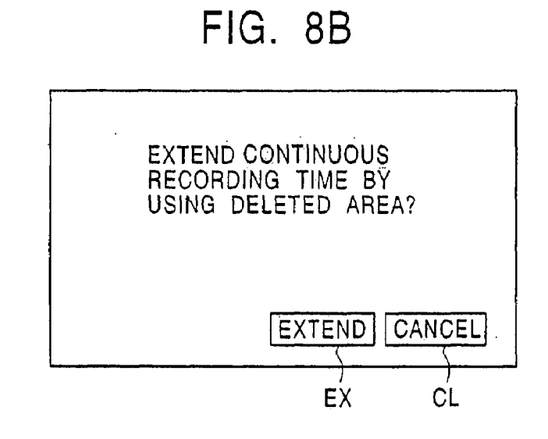

If it is determined in step S12 that the delete button DL has been clicked (operated), the system control circuit 10 sets the program selected by the selection frame CS as shown in FIG. 8A as the deletion target program and stores deletion program position information indicative of the recording start position and the recording capacity into a built-in register (not shown) (step S14). For example, if the program Y is the deletion target as shown in FIG. 6A, the position R as a recording start position and the recording capacity t3 are stored as deletion program position information into the built-in register. Subsequently, the system control circuit 10 deletes the recording program information corresponding to the program serving as a deletion target as mentioned above from the program list memory 30 (step S15). By the execution of step S15, the program serving as a deletion target, for example, the program Y shown in FIG. 6A is deleted from the stored program list as shown in FIG. 8A from the next time. Subsequently, the system control circuit 10 supplies an operation image display command for allowing the user to select whether or not a continuous recording time is extended to the OSD signal processing circuit 19. Furthermore, the system control circuit 10 supplies a selection signal for alternatively supplying the operation image signal $D_c$ generated from the OSD signal processing circuit 19 to the display device 200 to the selector 18 (step S16). In accordance with the execution of step S16, the display device 200 performs an extension selecting operation display for allowing the user to select whether the continuous recording time is extended or not as shown in FIG. 8B. Subsequently, the system control circuit 10 discriminates whether the clicking operation of an expand button EX displayed on the screen as shown in FIG. 8B has been executed by operating the operating device 22 by the user or not (step S17). If it is decided in step S17 that the expand button EX is not clicked, the system control circuit 10, subsequently, discriminates whether the clicking operation of the cancel button CL displayed on the screen as shown in FIG. 8B has been executed by operating the operating device 22 by the user or not (step S18). If it is decided in step S18 that the cancel button CL is not clicked, the system control circuit 10 returns to the execution of step S17 and repetitively executes the operations as mentioned above. That is, until the user clicks the cancel button CL or the expand button EX during the extension selecting operation display as shown in FIG. 8B, the system control circuit 10 continues the display of the list of the storage programs as shown in FIG. 8B.

Figure 6B:
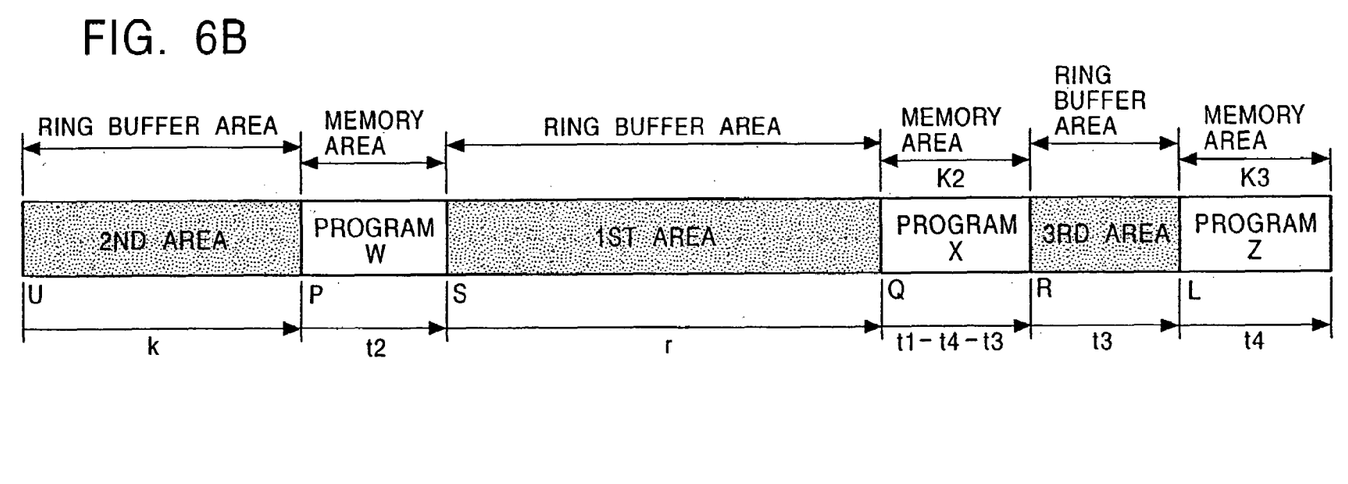
Figure 9A:
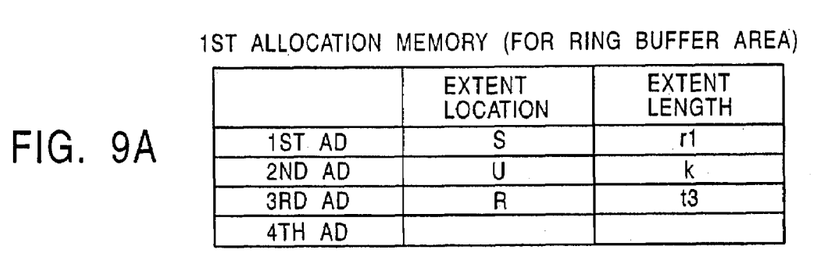
FIGS. 9A and 9B are diagrams showing examples of memory contents in the first allocation memory 20 and the second allocation memory 21 when the position of a deleted program Y is used an extension area of the ring buffer area.
Figure 9B:
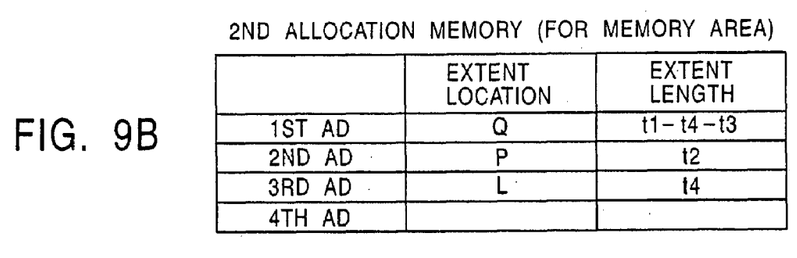

If it is determined in step S17 that the clicking operation of the expand button EX has been executed, the system control circuit 10 generates the allocation descriptor based on deletion program position information stored in the built-in register and additionally writes it into the first allocation memory 20. The system control circuit 10 further rewrites the contents in the second allocation memory 21 based on the deletion program position information (step S19). For example, if the program Y as shown in FIG. 6A becomes a deletion target, the system control circuit 10 additionally writes the head position R of the program Y and its recording capacity t3 into the first allocation memory 20 as a third allocation descriptor as shown in FIG. 9A. The area where the program Y as shown in FIG. 6A has been recorded is, thus, shifted to the ring buffer area (third area) as shown in FIG. 6B. That is, the ring buffer area is extended. Since the program Y recorded in a memory area K1 as shown in FIG. 6A is shifted to the ring buffer area, the memory area K1 is divided into a memory area K2 and a memory area K3 as shown in FIG. 6B. The system control circuit 10, therefore, rewrites the first AD corresponding to the memory area K1 stored in the second allocation memory 21 as shown in FIG. 7B to the AD corresponding to the memory area K2 as shown in FIG. 9B. The system control circuit 10 further generates the allocation descriptor corresponding to the memory area K3 as shown in FIG. 6B and additionally writes it into the second allocation memory 21 as a third AD as shown in FIG. 9B.

Figure 8C:
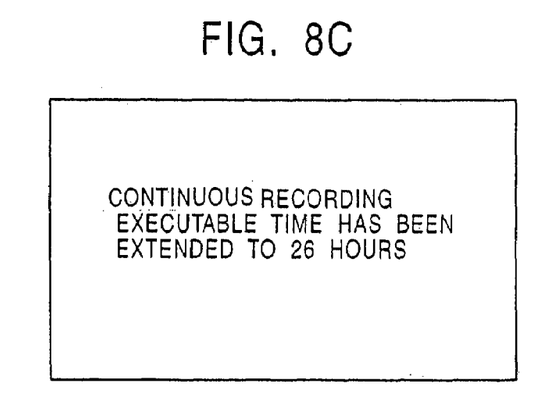

After the execution of step S19, the system control circuit 10 obtains a final continuous recording executable time obtained after the extension based on the recording capacity of the area extended as a ring buffer area as mentioned above (for example, the recording capacity t3 of the third area shown in FIG. 6B) (step S20). Subsequently, the system control circuit 10 supplies a continuous recording time notification display command for informing the user of the continuous recording executable time obtained after the extension obtained in step S20 to the OSD signal processing circuit 19. Further, the system control circuit 10 supplies the selection signal for alternatively supplying the operation image signal $D_C$ generated from the OSD signal processing circuit 19 to the display device 200 to the selector 18 (step S21). In accordance with the execution of step S21, the display device 200 performs a continuous recording time notification display for notifying the final continuous recording executable time obtained after the extension as shown in FIG. 8C.

After the execution of step S21 or if it is determined that the cancel button CL has been clicked in steps S13 and S18, the system control circuit 10 exits from the stored program erasing routine shown in FIG. 5 and returns to the execution of the main routine (not explained).

According to the execution of the stored program erasing routine, therefore, when the user executes the erasing operation to erase the program recorded in the memory area, the area where the program as an erasure target has been recorded can be extended as a ring buffer area.

The invention is not limited to the embodiment as mentioned above. For example, although the video signal has been recorded onto the recording medium according to the apparatus for recording and reproducing information described in the embodiment, the invention can be also applied to an apparatus for recording and reproducing only the audio signal. Further, although the hard disk has been used as a recording medium in the embodiment, a rewritable optical disk such as DVD-RW or DVD-RAM can be also used.

According to the invention as described in detail above, if the program recorded in the memory area was deleted, since the area where the program has been recorded can be set to the ring buffer area, extension of the ring buffer area is realized.

This application is based on Japanese Patent Application No. 2000-383597 which is hereby incorporated by reference.

What is claimed is:

1. An apparatus for recording and reproducing information in which a ring buffer area where an information signal is circulatively recorded and reproduced and a memory area where the information signal is permanently stored are formed on a recording medium, comprising:

a memory in which allocation position information indicating the position where said ring buffer area is allocated on said recording medium has been stored;

a recording and reproduction controller for performing recording and reproduction of information into/from said ring buffer area based on said allocation position information stored in said memory;

an operating component for generating an erasing command signal for erasing the information signal as an erasure target from said information signal recorded in said memory area in accordance with an erasing operation; and a ring buffer area extending component for additionally storing position information of the information signal as said erasure target into said memory in order to set the area where the information signal as said erasure target has been recorded to the ring buffer area in response to said erasing command signal.

2. An apparatus according to claim 1, further comprising an operation image signal generating component for generating an image signal for displaying an extension selecting operation image for prompting a selection of whether said ring buffer area is extended or not in accordance with said erasing operation, and wherein only when the selecting operation to expand said ring buffer area is executed by said operating component, said ring buffer area extending component additionally stores the position of the information signal as said erasure target into said memory.

3. An apparatus for recording and reproducing information in which a ring buffer area where a video signal is circulatively recorded and reproduced and a memory area where the video signal is permanently stored are formed on a recording medium, comprising:

a memory in which allocation position information indicating the position where said ring buffer area is allocated on said recording medium has been stored;

a recording and reproduction controller for performing recording and reproduction into/from said ring buffer area based on said allocation postion information stored in said memory;

an operating component for generating an erasing command signal for erasing the video signal as an erasure target from said video signal recorded in said memory area in accordance with an erasing operation; and a ring buffer area extending component for additionally storing position information of the video signal selected as said erasure target into said memory in order to add the area where the video signal selected as said erasure target has been recorded to the ring buffer area in response to said erasing command signal.

4. An apparatus according to claim 3, further comprising an operation image signal generating component for generating an image signal for displaying an extension selecting operation image for prompting a selection of whether said ring buffer area is extended or not in accordance with said erasing operation, and wherein only when the selecting operation to expand said ring buffer area is executed by said operating component, said ring buffer area extending component additionally stores the position of said video signal selected as said erasure target into said memory.

5. An apparatus according to claim 4, further comprising a continuous recording executable time calculating component for calculating a continuous recording executable time in said ring buffer area obtained after the area has been extended by said ring buffer area extending component, and wherein said operation image signal generating component also generates an image signal for displaying a continuous recording time notification image for informing said continuous recording executable time.

6. An apparatus according to claim 3, wherein said recording medium is a hard disk.

* * * * *